United States Patent
Mach

(10) Patent No.: US 9,664,518 B2
(45) Date of Patent: May 30, 2017

(54) METHOD AND SYSTEM FOR COMPARING PERFORMANCE STATISTICS WITH RESPECT TO LOCATION

(75) Inventor: Paul Mach, South Lake Tahoe, CA (US)

(73) Assignee: Strava, Inc., San Francisco, CA (US)

(*) Notice: Subject to any disclaimer, the term of this patent is extended or adjusted under 35 U.S.C. 154(b) by 1051 days.

(21) Appl. No.: 13/214,369

(22) Filed: Aug. 22, 2011

(65) Prior Publication Data

US 2012/0053896 A1    Mar. 1, 2012

Related U.S. Application Data

(60) Provisional application No. 61/377,669, filed on Aug. 27, 2010.

(51) Int. Cl.
 A63B 24/00    (2006.01)
 G01C 21/14    (2006.01)

(52) U.S. Cl.
 CPC .......... *G01C 21/14* (2013.01); *A63B 24/0062* (2013.01)

(58) Field of Classification Search
 CPC .. G01C 22/002; G01C 21/14; A63B 24/0062; A63B 24/0021; A63B 24/0084; A63B 2220/12; A63B 2220/20; A63B 2024/0025; A63B 2024/0068; C01C 21/14
 USPC ........................................................ 702/179
 See application file for complete search history.

(56) References Cited

U.S. PATENT DOCUMENTS

| | | |
|---|---|---|
| 5,552,990 A | 9/1996 | Ihara et al. |
| 6,366,927 B1 | 4/2002 | Meek et al. |
| 6,453,235 B1 | 9/2002 | Endo et al. |
| 6,853,917 B2 | 2/2005 | Miwa |
| 7,080,065 B1 | 7/2006 | Kothuri et al. |
| 7,454,002 B1 | 11/2008 | Gardner et al. |
| 7,662,064 B2 | 2/2010 | Lee et al. |
| 7,756,639 B2 | 7/2010 | Colley et al. |
| 7,828,697 B1 | 11/2010 | Oberrieder et al. |
| 7,901,292 B1 | 3/2011 | Uhlir et al. |
| 7,931,562 B2 | 4/2011 | Ellis et al. |
| 7,953,549 B2 | 5/2011 | Graham et al. |
| 8,108,139 B1 | 1/2012 | Pylant |
| 8,112,251 B2 | 2/2012 | Case et al. |

(Continued)

FOREIGN PATENT DOCUMENTS

WO    2008105651    9/2008

OTHER PUBLICATIONS

Huang, Weichun, "Accurate anchoring alignment of divergent sequences", Bioinformatics vol. 22 No. 1 2006, pp. 29-34.*

(Continued)

*Primary Examiner* — Gregory J Toatley
*Assistant Examiner* — Yoshihisa Ishizuka
(74) *Attorney, Agent, or Firm* — Van Pelt, Yi & James LLP

(57) ABSTRACT

One embodiment of an invention which computes a location based alignment of two tracks over a set route. Once aligned, a comparison of performance statistics is made at each position along the track. Time and distance gap information is also computed at each position. The results are then displayed in a plot (17) so one can see where different performance statistics changed, including time gap information (19). The data is also linked to a map (8) so one can visualize the locations more clearly. It is also possible to compare multiple tracks (25) to one reference track (23) for greater insight.

19 Claims, 2 Drawing Sheets

(56) References Cited

U.S. PATENT DOCUMENTS

| | | | |
|---|---|---|---|
| 8,121,785 | B2 | 2/2012 | Swisher et al. |
| 8,271,497 | B2 | 9/2012 | Ikenoue |
| 8,326,532 | B2 | 12/2012 | Kmiecik et al. |
| 2001/0027373 | A1 | 10/2001 | Bates et al. |
| 2005/0033515 | A1 | 2/2005 | Bozzone |
| 2005/0049765 | A1 | 3/2005 | Chetia et al. |
| 2005/0137871 | A1* | 6/2005 | Capman et al. ............... 704/268 |
| 2005/0250458 | A1 | 11/2005 | Graham et al. |
| 2005/0288154 | A1 | 12/2005 | Lee et al. |
| 2007/0208469 | A1 | 9/2007 | Wille et al. |
| 2007/0271036 | A1 | 11/2007 | Atarashi |
| 2007/0288157 | A1* | 12/2007 | Peterman ...................... 701/207 |
| 2008/0033633 | A1* | 2/2008 | Akiyoshi ............ G01C 21/343 701/418 |
| 2008/0082254 | A1 | 4/2008 | Huhtala et al. |
| 2008/0096726 | A1 | 4/2008 | Riley et al. |
| 2008/0167813 | A1 | 7/2008 | Geelen et al. |
| 2008/0262717 | A1 | 10/2008 | Ettinger |
| 2008/0262721 | A1* | 10/2008 | Guo et al. ...................... 701/208 |
| 2009/0043495 | A1 | 2/2009 | Hattori et al. |
| 2009/0070035 | A1 | 3/2009 | Van Buer |
| 2009/0088962 | A1 | 4/2009 | Jones |
| 2009/0204597 | A1 | 8/2009 | Mani et al. |
| 2009/0326809 | A1 | 12/2009 | Colley et al. |
| 2010/0042427 | A1 | 2/2010 | Graham et al. |
| 2010/0062817 | A1 | 3/2010 | Seydoux |
| 2010/0062905 | A1 | 3/2010 | Rottler et al. |
| 2010/0063904 | A1 | 3/2010 | Ronen et al. |
| 2010/0088023 | A1 | 4/2010 | Werner |
| 2010/0099437 | A1 | 4/2010 | Moerdijk et al. |
| 2010/0131184 | A1 | 5/2010 | Stanton |
| 2010/0153348 | A1 | 6/2010 | Perczynski et al. |
| 2010/0185386 | A1 | 7/2010 | Hess |
| 2010/0210421 | A1 | 8/2010 | Case et al. |
| 2010/0279825 | A1 | 11/2010 | Riley et al. |
| 2011/0003665 | A1* | 1/2011 | Burton et al. .................... 482/9 |
| 2011/0032105 | A1 | 2/2011 | Hoffman et al. |
| 2011/0137546 | A1 | 6/2011 | Roesser et al. |
| 2011/0208429 | A1 | 8/2011 | Zheng et al. |
| 2011/0243431 | A1 | 10/2011 | Sangappa et al. |
| 2011/0289031 | A1 | 11/2011 | Zheng et al. |
| 2011/0307165 | A1 | 12/2011 | Hiestermann et al. |
| 2011/0320156 | A1 | 12/2011 | Oohashi et al. |
| 2012/0004845 | A1 | 1/2012 | Kmiecik et al. |
| 2012/0028761 | A1 | 2/2012 | Dorogusker et al. |
| 2012/0095578 | A1 | 4/2012 | Tchao et al. |
| 2012/0158668 | A1 | 6/2012 | Tu et al. |
| 2012/0209518 | A1 | 8/2012 | Nowak et al. |
| 2012/0253488 | A1 | 10/2012 | Shaw et al. |
| 2012/0265432 | A1 | 10/2012 | Ashby |
| 2013/0006925 | A1 | 1/2013 | Sawai et al. |
| 2013/0031049 | A1 | 1/2013 | Watanabe et al. |
| 2013/0166049 | A1 | 6/2013 | Werner et al. |
| 2014/0058661 | A1 | 2/2014 | Choi et al. |
| 2014/0350850 | A1 | 11/2014 | Kmiecik et al. |

OTHER PUBLICATIONS

Author Unknown, "RouteBoxer Documentation: Examples" (Step 1), accessed from Archive.org https://web.archive.org/web/20100826025922/http://google-maps-utility-library-v3.googlecode.com/svn/trunk/routeboxer/docs/examples.html, archive date Aug. 26, 2010, accessed Jul. 23, 2014.

Author Unknown, "RouteBoxer Documentation: Examples" (Step 2), accessed from Archive.org https://web.archive.org/web/20100826025922/http://google-maps-utility-library-v3.googlecode.com/svn/trunk/routeboxer/docs/examples.html, archive date Aug. 26, 2010, accessed Jul. 23, 2014.

Author Unknown, "RouteBoxer Documentation: Examples" (Step 3), accessed from Archive.org https://web.archive.org/web/20100826025922/http://google-maps-utility-library-v3.googlecode.com/svn/trunk/routeboxer/docs/examples.html, archive date Aug. 26, 2010, accessed Jul. 23, 2014.

Author Unknown, "RouteBoxer Documentation: Examples" (Step 4), accessed from Archive.org https://web.archive.org/web/20100826025922/http://google-maps-utility-library-v3.googlecode.com/svn/trunk/routeboxer/docs/examples.html, archive date Aug. 26, 2010, accessed Jul. 23, 2014.

Author Unknown, "RouteBoxer Documentation: Examples" (Step 5), accessed from Archive.org https://web.archive.org/web/20100826025922/http://google-maps-utility-library-v3.googlecode.com/svn/trunk/routeboxer/docs/examples.html, archive date Aug. 26, 2010, accessed Jul. 23, 2014.

Author Unknown, "RouteBoxer Documentation: Examples" (Step 6), accessed from Archive.org https://web.archive.org/web/20100826025922/http://google-maps-utility-library-v3.googlecode.com/svn/trunk/routeboxer/docs/examples.html, archive date Aug. 26, 2010, accessed Jul. 23, 2014.

Author Unknown, "RouteBoxer Documentation: Examples" (Step 7), accessed from Archive.org https://web.archive.org/web/20100826025922/http://google-maps-utility-library-v3.googlecode.com/svn/trunk/routeboxer/docs/examples.html, archive date Aug. 26, 2010, accessed Jul. 23, 2014.

Author Unknown, "RouteBoxer Documentation: Examples" (Step 8), accessed from Archive.org https://web.archive.org/web/20100826025922/http://google-maps-utility-library-v3.googlecode.com/svn/trunk/routeboxer/docs/examples.html, archive date Aug. 26, 2010, accessed Jul. 23, 2014.

Author Unknown, "RouteBoxer Documentation: Examples" (Step 9), accessed from Archive.org https://web.archive.org/web/20100826025922/http://google-maps-utility-library-v3.googlecode.com/svn/trunk/routeboxer/docs/examples.html, archive date Aug. 26, 2010, accessed Jul. 23, 2014.

Author Unknown, "RouteBoxer Documentation: Examples" (Step 10), accessed from Archive.org https://web.archive.org/web/20100826025922/http://google-maps-utility-library-v3.googlecode.com/svn/trunk/routeboxer/docs/examples.html, archive date Aug. 26, 2010, accessed Jul. 23, 2014.

Collecting, Processing, and Integrating GPS Data into GIS, 2002, NCHRP.

* cited by examiner

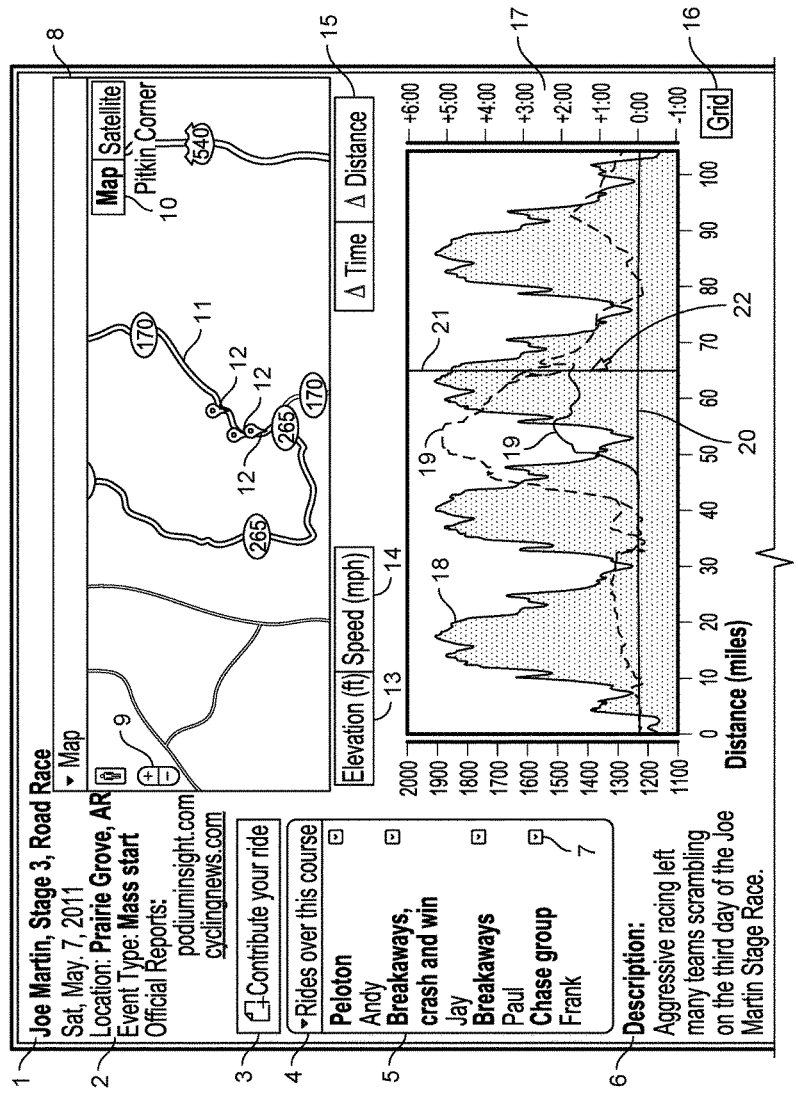

| Reference or Baseline Ride | Elapsed Time | Distance (miles) | Elevation [ft] Gain Loss Cur | Speed (mph) Min Max Cur |
|---|---|---|---|---|
| Andy | 2:37:11:00 | 64.97 | 3195 2506 1857 | 25.6 |

The first move, of about 9 riders, was never allowed much time. It was brought back with a big effort up the climb.

The second move, of about 7 riders, was more promising but there were games in the break and lots of chasing by smaller teams.

Hover or select plot to see detailed info

| Compared Rides | ΔTime (mm:ss) Min Max Cur | ΔDistance (miles) Min Max Cur | Elevation [ft] Gain Loss Cur | Speed (mph) Min Max Cur |
|---|---|---|---|---|
| Breakaways, crash and win Jay | +2:04 | +0.8 | 0 +36 -33 | -4.2 |
| Breakaways Paul | +2:36 | +1.0 | 0 +43 -41 | -8.3 |
| Chase group Frank | +1:41 | +0.8 | 0 +33 -31 | -2.4 |

Jay crashed after the sprint line and dropped back to the chase group.

The front and chase groups merged and formed a group of about 20 riders. Motivations were low and no one wanted to ride. It was brought back again on the climb.

Jay attacked again near the end. The 4 riders gained almost 2 minutes. The Bissell team started chasing to guarantee Jay's win but maintain their GC positions.

(Cont.)

METHOD AND SYSTEM FOR COMPARING PERFORMANCE STATISTICS WITH RESPECT TO LOCATION

CROSS-REFERENCE TO RELATED APPLICATIONS

This application claims the benefit of provisional patent, application No. 61/377,669, filed 2010 Aug. 27 by the present inventor.

FEDERALLY SPONSORED RESEARCH

None.

SOURCE CODE LISTING compare.c: A C program receiving as input two tracks and outputting their alignment based on location. Inputs are Comma Separated Value (CSV) files with TIME,LATITUDE,LONGITUDE on each line. Output is one index pair per line, representing aligned points. The first of the pair refers to the line of the first input file, ref.csv below. The second of the pair refers to the line of the second file, other.csv below.
Input CSV example:
  1,34.044984318,-117.165059354
  2,34.045006279,-117.164999004
  3,34.045138378,-117.164755678
Output file example:
  1,5
  2,6
  4,9
The program is written in the C programming language. The GNU Scientific Library (availablet http://www.gnu.org/software/gsl/) is the only required nonstandard library. A C compiler is required to compile the code and one is available at little or no cost for most computer systems. An example of compiling and running the code using the GCC Compiler (available at http://gcc.gnu.org/) follows:
  >gcc -lgsl -lgslcblas compare.c -o compare
  >./compare -r ref.csv -o other.csv
This example assumes that all the standard libraries and the GNU Scientific Library are found in their default locations. If this is not the case, additional parameters may be required by GCC.
Output is displayed to the terminal in the format described above.

BACKGROUND

Prior Art

Recently, tracking devices have become readily available. Most utilize the Global Position System (GPS) to determine their location. A tracker will, at the very least, record the user's position, and time at that position. The recording is done at set intervals.

Depending on the application, the device may also record other key performance statistics at each position. Cyclists, for example, may record the location along with speed, distance traveled since start, elapsed time, heart rate, pedaling cadence, power output, temperature, etc.

As one travels a route, recorded positions are collected to form a track. The track may represent a run, hike, bike ride, drive, etc. It may also represent a sub-segment of such activities.

Some users want to compare their recorded tracks to others. Take, for example, a competitive cyclist. The rider would like to compare their ride, over a set course, to another rider's. They may also want to compare to their own ride from another time.

There are many software applications available to view a recorded track. Trackers provide a list of numbers, additional software is necessary to make the information meaningful. The software may display the track on a map and/or plot an elevation profile. These applications take a single track and allow one to dissect different properties of that single track only. They do not allow for direct comparisons between tracks.

On Apr. 14, 2009, Strava Inc. released an Internet based application, found at http://www.strava.com, for comparing tracks. The application compares total performance statistics over user defined intervals. It allows one to see how average statistics differed over an interval. However, the application does not allow one to compare specific points along the route, such as at the top of a hill.

Also, Strava's application does not allow one to see how much they were ahead or behind the other user at specific points, also known as a time or distance gaps. For example, rider A reached the top of a hill 15 seconds before rider B. Strava's application only provides a global summary of a track, or track segment.

On Dec. 16, 2009, Peaksware, LLC released a software package known as TrainingPeaks WKO+ Version 3.0. The software allows for the comparison of tracks based on elapsed time only. One can see how they compared after 5 minutes. But it may have taken a different amount of time to reach specific points. Using this software, one can only compare their performance statistics after a given amount of time. They can not compare statistics at specific points or locations, such as the top of a hill or at a given turn on the route.

The elapsed time comparisons approach taken by TrainingPeaks WKO+ Version 3.0 also makes it difficult to compare the same sections of road among tracks. One needs all trackers to start recording at the same time/place. For example, rider A starts their tracker 10 minutes before the start of their race and rider B starts their tracker at the actual start. There elapsed time is now off by 10 minutes and there is no way to realign them without extra information. Location data provides this information and eliminates the need to start the trackers at the same time.

On Aug. 28, 2009, Paul Mach, the inventor, published graphs produced by an early embodiment of this invention on his website. The information can be found at the world wide website http://paulmach.com/090828/195022/. Only the results were provided, no details of the embodiment of the invention were provided.

On May 15, 2010, the inventor again released information about the invention. No details of the embodiment were provided, just the end results produced. This embodiment was different from the one released on Aug. 28, 2009 by providing users a way to interact with the data.

SUMMARY

In accordance with one embodiment this invention computes a location based alignment of two tracks. Once aligned, a comparison of performance statistics is made at each position along the track. Time and distance gap information is also computed. The results are then displayed in a table or graph format. This allows the user to see how time and distance gaps changed and how performance statistics differed as the route was traversed.

DRAWINGS

Figures

FIG. 1: An embodiment of a user interface which displays the results of the performance statistics compared by location.

Reference Numerals

1 Title describing the comparison
2 Properties of the comparison
3 Option for others to contribute their tracks
4 List of tracks, called rides in this embodiment, that can be added to the plot (17)
5 Track along with its color used to show its data on the map (8) and plot (17) as well as a comment and name of the individual to whom it belongs
6 Extended description of the comparison shown
7 Object that triggers a menu for interacting with the track adjacent to it
8 Map of the area covered by the track
9 Display options for the map (8)
10 Map type options for the map (8)
11 Track highlighted over the map (8)
12 Markers showing the location of the tracked objects at a specific time highlighted (21) on the plot (17) by the pointer (22)
13 Button to toggle elevation underlay on the plot (17)
14 Button to toggle speed of reference (23) underlay on the plot (17)
15 Toggle buttons to display time gaps or distance gaps on the plot (17)
16 Toggle button to display grid over the plot (17)
17 Plot, x-axis is distance traveled, left y-axis is elevation for the elevation underlay that can be toggled with (13), right y-axis is for the time gap between the reference rider (23) and other riders (25)
18 Elevation underlay, toggled by button (13)
19 Plot lines indicating gaps between reference track (23) and comparison tracks (25), colors correspond throughout the figure including in the track list (4), map (8) and table (26, 27, 28)
20 Horizontal line at 0 representing the lack of gap between the reference track and itself (23)
21 Vertical line representing a position highlighted by the pointer (22), stats for the position are shown in the table (26, 27) and the geographic positions are highlighted on the map (8) with the markers (12)
22 Pointer used to highlight (21) part of the plot (17)
23 The reference ride/track that is compared to the other rides (25)
24 Object that triggers a menu for interacting with the track adjacent to it
25 List of rides/tracks being compared to the reference (23)
26 Table with headings indicating information about the ride/track that is displayed for the location highlight by (21)
27 Table with headings indicating information about the comparison relative to the reference (23)
28 Colors corresponding to the different tracks (5), they correspond throughout the figure including the markers (12) in the map (8) and the lines (19) on the plot (17)
Glossary:

Distance Gap: The distance between two objects, whose motions may be represented by a track, at a specific point and time. For example, when rider A reached the top of the hill, rider B was 50 meters behind.
Latitude/Longitude Euclidean Distance: Let X be a point with latitude and longitude components, X.lat and X.lng respectively. Let Y be a similar, separate point. The latitude/longitude euclidean distance is defined as the square root of:
(X.lat−Y.lat)*(X.lat−Y.lat)+(X.lng−Y.lng)*(X.lng−Y.lng)
Performance Statistics: Additional information recorded by a tracker along with the position. For example, a tracker designed for cycling would record the speed, distance traveled, elapsed time, elevation, heart rate, pedaling cadence, power output, temperature, etc. This is in addition to the standard position (can be latitude, longitude) and current time. These additional pieces of information can change drastically depending on, but not limited to, terrain, weather or user fatigue.
Position: Also known as a point. A position is a single location returned by a receiver. It consists of the location (can be latitude, longitude) and the current time. It may also contain other performance statistics relevant to the current application.
Receiver: An electronic device that receives a signal and computes the time and the position (can be latitude, longitude), of the device.
Route: A path, usually on the surface of the earth. Can also be thought of as a race course or trail.
Time Gap: The difference in time it took two objects, whose motion may be represented by a track, to reach a specific point. For example, rider A reached the top of the hill 5 seconds before rider B.
Track: A collection of positions, or points, recorded by a tracker as one traverses a route. The track may represent an activity such as a run, hike, bike ride or drive.
Tracker: A special receiver that records the position information it computes. As one moves, the tracker will record, at intervals, the time, and the position (can be latitude, longitude). The tracker may also record other information that is relevant to the current context.

DETAILED DESCRIPTION

This embodiment of the invention is described in the context of cycling. However, all the ideas apply to any application where one wants to compare two tracks over the same route. These other applications include, but are not limited to, running, triathlon, hiking, or driving.

In the context of cycling, a track represents a bike ride. Such tracks are collected using a tracker that travels with the cyclist as they ride. The tracker may also record a number of other performance statistics to better analyze the ride. The position, latitude and longitude in this embodiment, and time are the only required items. Speed, distance traveled and elapsed time can be estimated from the position and time.

This invention compares two tracks based on location. If two people ride the same route, we align their tracks so we can compare their performance statistic at physical locations along the route. The location based alignment allows one to also compute time gaps at each location, ie. the difference in time it took each rider to reach a certain point. After time gaps are computed one can then determine the distance gap between the two riders at a given time.

We will consider two different types of comparisons between tracks. The first is called an individual event. For this event each rider starts at a different time and covers the same course. The second is called a mass start event. It involves all riders starting together. In both cases riders strive to complete the course in the shortest amount of time.

The invention consists of three main parts: the alignment of the two tracks (I), the comparison of aligned points (II), and the display of the results in a useful manner (III).

(I) The Alignment of Two Tracks:

Let A(j) be a point in track A and B(k) be a point in track B. The problem can be summarized as: For each point A(j) we want to find a matching point B(k). A match is defined as a correspondence, or location match, among two points in a route.

Each track is sampled at discrete points. Thus, there is no guarantee there will be an exact location match between tracks. We need to find the closest/best match.

A simple case is when two tracks represent a route that travels directly from one location to the other. The alignment can be thought of as laying one track on top of the other in two-dimensions. Then for every point A(j) we find the closest point B(k).

In other cases the route is more complicated. For example, an out and back or involving multiple laps. In the out and back case, simply finding the closest B(k) to every A(j) does not work. A point A(j) representing the "out" part of the route may be closest to a point B(k) in the "back" part of the route. This situation is common due to inaccurate position data recorded by the trackers.

One must take special care while doing the alignment due to these more complicated cases. The algorithm below is one embodiment of this part of the invention that is designed to address these problem.

The Algorithm:

(i) For each track, the points are reduced:

When frequently sampling points and traveling in a straight line, one ends up with many redundant points in the middle. These redundant points do not add anything to the shape of the route. The Douglas-Peucker Algorithm for polyline simplification is used to remove these types of redundant points. A latitude/longitude euclidean distance threshold of 0.0005 is used in this embodiment.

The result is a set of points that are a subset of the original points in the track. This works to reduce the effect of the position sampling rate on the alignment.

(ii) Create a b-spline with the remaining points:

A standard degree 10 b-spline is created using the remaining points as anchors and a uniform knot vector.

This works to smooth the route by eliminating any noise that many be present. This is necessary in the event the tracker had poor accuracy.

(iii) Resample the b-spline path with respect to arc-length:

B-splines are parametric functions defined by their degree, knot vector, and anchor points. They are then sampled used a single parametric variable. Formulas for this computation are readily available. The curve is sampled at intervals of 0.0005 in the latitude/longitude space.

Steps (i), (ii), and (iii) are necessary to create a smooth, evenly sampled, representation of the track.

(iv) Use the Needleman-Wunsch Dynamic Programming Algorithm to align the resampled b-spline paths:

The Needleman-Wunsch Algorithm used is similar to the ones used for DNA sequence alignment. There are several differences:

(a) The scoring function (b) The search for optimal sub-alignments is limited to just the 3 previous resampled b-spline locations of either track.

(c) A point in track A can be aligned to multiple points in track B. This is uncommon but accommodates for situations such as a rider stopping for a moment.

The scoring function used in this embodiment is as shown:

Let $d$=latitude/longitude euclidean distance between the two points $$score = 0.0003 * 0.0003 - d * d$$

A limited search area is used when computing the optimal score. Only points within 3 resampled b-spline locations are considered. This eliminates the need for a gap penalty and improves the run time dramatically.

(v) Traceback the dynamic programming result:

The dynamic programming algorithm produced the optimal alignment between points on the resampled b-spline for the a given scoring function. The dynamic programming algorithm also builds in continuity and directionality of the points. This means that if A(1) corresponds to B(1) and A(5) corresponds to B(5) then A(3) can not correspond to B(7).

(vi) Map back the b-spline points to their nearest track point:

Each b-spline point, using its parameter value, can be mapped to one of the anchors. This anchor is a reduced point. We now do a local search along the track using the anchor point as the start and search for the closest track point to the original b-spline point.

(vii) Remove aligned track positions which are further apart than a specified distance. In this embodiment, 40 meters is used. This many indicate the input tracks covered different routes or the tracker had poor accuracy around that location.

Once this algorithm completes we have an alignment between the two tracks. This alignment is based on the locations and the scoring function in step (iv). The end result is a map from one track to the other. Every A(j) has a corresponding point B(k) if a match exists. The alignment between A and B is equivalent to the alignment between B and A.

If A(j) and B(k) correspond they may not represent an exact match in space. The correspondence represents a best match. The error is proportional to the distance between the two points. This causes the error between two points to be independent of the error between any other set of points. This is one novel aspect of the invention. The error is not compounded as the track progresses.

Such a compounding error would be found if one were to align by distance traveled. Distance traveled can be off by as much as 5 percent due to the inaccuracies of the receiver or slight differences in the route. For example, when two riders' trackers say they are 10.0 miles in, they are most likely not at the same location.

A computer program implementation of this embodiment of this part of the invention is provided in the Source Code Listing under the name "compare.c."

(II) Computing the Comparison:

Again we let A(j) be a point in track A and B(k) be a point in track B. Part (I) provides an alignment between the two tracks. So for point A(j) there is a point, B(k), that corresponds, or represents a similar location along the route.

In this part we compute a comparison between the two tracks. We want to see how the rider's performance statistics compared at different locations along the route.

The alignment between A and B is the same as the alignment between B and A. However, the comparison between A and B is not the same as the comparison between B and A. Let us look at why this is the case.

Let $A(j)$ and $B(k)$ correspond. The speed at $A(j)$ is 15 mph and the speed at $B(k)$ is 10 mph. Now let us compare A to B. We say at location $A(j)$, rider A was traveling 5 mph faster. However, if we compare B to A, at the location $B(k)$, rider B was traveling 5 mph slower. In each case, one ride is the reference and the over differs from that reference by a fixed amount.

Now for the actual comparison. For every comparison $A(j)$ to $B(k)$ we let $C(j)$ equal to $B(k)-A(j)$. This subtraction is done for speed, time, and all other performance statistics. The end results is C, a set of lists of positive and negative numbers. Each $C(j)$ matches with $A(j)$. At position $A(j)$ the difference of the speed, time and other performance statistics are found in $C(j)$.

Special care must be taken with the time difference or time gap. If the tracks represent a mass start event, a simple subtraction is sufficient. If the tracks represent an individual event, an offset needs to be subtracted from the time to correct for the different start times. It should be noted that the location based alignment allows this time gap to be computed. We can use the difference in time at the first point in the alignment, found in $C(1)$, as the offset.

The distance difference represents how far ahead or behind rider B was, at a point, compared to rider A. This is computed using the time gap information. We compare A to B and get C as described above. Let $A(j)$ and $B(k)$ correspond and $C(j)$ contain the time gap and other information.

Using the time gap, G, in $C(j)$, we find a new point $B(m)$ that was recorded G seconds before $B(k)$. G may be negative. Let us look at an example, the time gap, G, at $C(j)$ is 5 seconds. This means that at the location represented by $A(j)$, rider B arrived there 5 seconds after rider A. The time at $B(k)$ was greater than $A(j)$. Now we look at track B and find the position that is 5 seconds before $B(k)$ and call it $B(m)$.

The distance different is the distance traveled at $B(m)$ minus the distance traveled at $B(k)$. In the situation described above this distance would be negative because at location $A(j)$ rider B is behind, he arrived at $A(j)$ 5 seconds after rider A.

The distance difference information relies on the time gap information and its accurate computation is unique to this invention. It depends on the location based alignment of the two tracks.

(III) Once we have a comparison, the results need to be displayed in a meaningful, useful way. Such a display can consist of a table, but the data is better seen on a graph or plot. An embodiment of this portion can be found in FIG. 1.

A standard plot (17) has the time gap or distance gap on the y-axis, plotted with respect to the distance traveled on x-axis. This allows the user to see how the time gap (19) or distance gap changed as the route was traversed. This type of result is unique to this invention.

One can also plot performance statistics along the y-axis. The values plotted are comparisons so we see how the two riders differed at points along the route. This is useful because traveling 20 mph may or may not be significant depending on if the rider is going up or down hill. Thus, comparing to another rider adds more information about what happened. This is unique to this invention.

The plot may also be linked to a map (8) of the track. As the user selects different points along the x-axis of the graph, the corresponding locations (12) of the riders are highlighted on the map. This allows the user to see where things happened. This is unique to this invention.

This embodiment describes a comparison between two tracks. It many be useful to view the comparison between rides A and B, and rides A and C on the same plot. For example, there are many time gap lines (19) on the plot (17) that correspond to the riders selected (28).

To conclude, the invention takes two tracks, aligns them, compares them and displays the result to the user. This comparison provides up to a second by second comparison of the tracks. Such a detailed analysis is unique to this invention and is useful in many contexts, including cycling, running, hiking, and triathlon.

ADVANTAGES

From the description above, several advantages of one of more aspects are as follows:

(i) The location based alignment of tracks eliminates the need for synchronized tracker start. The trackers can be started at anytime and an alignment can be done later on any portion of the route. This avoids the need to reset distance traveled or elapsed time at the start of the section of interest.

(ii) Performance statistics are compared at all locations along a route. One can see how the compared performance statistics changed as the route was traversed. This is more useful than comparing whole route averages.

(iii) A time gap is computed at every location along the route. This allows one to determine where a rider gained or lost their advantage to the other. This is more useful than just comparing elapsed time over the whole route.

(iv) A distance gap is computed to show how far a rider was ahead or behind another at each location.

SEQUENCE LISTING

None.

CONCLUSION

Accordingly, the reader will see that the comparison of performance statistics by location has many advantages. By comparing at all locations on the route, one can visualize on a plot where the compared performance statistics changed. A location based alignment is necessary to keep the information in sync. Synchronization of trackers is unnecessary, the location provides that information.

Location based comparison is the pure comparison. For example, at the top of the hill, rider A was traveling 5 mph faster than rider B. This eliminates differences in terrain and weather and ensures both riders have covered the same amount of the route up to that point. Just the riders' abilities are being compared.

Although the description above contains many specifics, these should not be construed as limiting the scope of the embodiments but as merely providing illustrations of some embodiments. For examples, the tracks can represent any case where one wants to compare performances over a set route.

Thus the scope of the embodiments should be determined by the appended claims and their legal equivalents, rather than by the examples given.

I claim:

1. A system for comparing performance data, comprising:
a Global Positioning System (GPS) receiver of a GPS recording device configured to record a first track including a first series of points, wherein each of the first series of points comprises a corresponding location and a corresponding performance statistic, wherein the first track is associated with a route and a first activity;
a processor configured to:
receive the first track including the first series of points;
receive a second track including a second series of points, wherein each of the second series of points comprises a corresponding location and a corresponding performance statistic, wherein the second track is associated with the route and a second activity;
align the first track and the second track to facilitate comparing the performance data associated with the first activity and the second activity, comprising:
remove one or more redundant points from the first series of points to generate a first series of anchors for the first track;
remove one or more redundant points from the second series of points to generate a second series of anchors for the second track;
determine a first set of resampled points based at least in part on a first path generated from the first series of anchors;
determine a second set of resampled points based at least in part on a second path generated from the second series of anchors;
determine a first alignment between the first set of resampled points and the second set of resampled points using a scoring function;
determine a first mapping of the first set of resampled points back to the first series of anchors;
determine a second mapping of the second set of resampled points back to the second series of anchors; and
determine a second alignment between the first series of anchors and the second series of anchors based at least in part on 1) the first alignment between the first set of resampled points and the second set of resampled points, 2) the first mapping of the first set of resampled points back to the first series of anchors, and 3) the second mapping of the second set of resampled points back to the second series of anchors, wherein the second alignment comprises a determination for a first point from the first series of anchors a corresponding location match point from the second series of anchors; and
compare the performance data associated with the first activity and the second activity, comprising:
determine a comparison based at least in part on a corresponding performance statistic associated with the first point from the first series of anchors and a corresponding performance statistic associated with the corresponding location match point from the second series of anchors based on results of the aligning of the first track and the second track; and
output, in a visual display, the comparison of the performance data associated with the first activity and the second activity with a corresponding distance along the route; and
a memory coupled to the processor and configured to provide instructions to the processor.

2. The system of claim 1, wherein the processor is further configured to present a plurality of comparisons based at least in part on corresponding performance statistics associated with a plurality of points from the first series of anchors and corresponding performance statistics associated with a corresponding plurality of points from the second series of anchors in the visual display corresponding to different distances along the route.

3. The system of claim 1, wherein the comparison comprises a difference between the corresponding performance statistic associated with the first point from the first series of anchors and the corresponding performance statistic associated with the corresponding location match point from the second series of anchors.

4. The system of claim 1, wherein the comparison comprises a difference between the corresponding performance statistic comprising a time associated with the first series of anchors and the corresponding performance statistic comprising a time associated with the corresponding location match point from the second series of anchors.

5. The system of claim 1, wherein the comparison comprises a difference between the corresponding performance statistic comprising a time associated with the first point from the first series of anchors and the corresponding performance statistic comprising a time associated with the corresponding location match point from the second series of anchors, and wherein the processor is further configured to determine a time gap associated with the first point based on the difference.

6. The system of claim 1, wherein the comparison comprises a difference between the corresponding performance statistic comprising a time associated with the first point from the first series of anchors and the corresponding performance statistic comprising a time associated with the corresponding location match point from the second series of anchors, and wherein the processor is further configured to determine a distance gap based on the difference.

7. The system of claim 1, wherein the corresponding performance statistic associated with the first point includes one or more of the following: time, speed, distance traveled, heart rate, power, and temperature.

8. The system of claim 1, wherein determining for the first point the corresponding location match point from the second series of anchors comprises determining a point from the second series of anchors that is closest to the first point.

9. The system of claim 1, wherein the processor is further configured to:
generate the first path based at least in part on the first series of anchors;
generate the second path based at least in part on the second series of anchors; and
wherein to determine the first alignment between the first set of resampled points and the second set of resampled points comprises to use dynamic programming.

10. The system of claim 1, wherein the processor is further configured to:

generate the first path based at least in part on the first series of anchors, wherein the first path comprises a first smooth path; and generate the second path based at least in part on the second series of anchors, wherein the second path comprises a second smooth path.

11. A method for comparing performance data, comprising:

receiving a first track including a first series of points recorded by a Global Positioning System (GPS) recording device, wherein a GPS receiver of the GPS recording device is configured to record the first track including the first series of points, wherein each of the first series of points comprises a corresponding location and a corresponding performance statistic, wherein the first track is associated with a route and a first activity;

receiving a second track including a second series of points, wherein each of the second series of points comprises a corresponding location and a corresponding performance statistic, wherein the second track is associated with the route and a second activity;

aligning the first track and the second track to facilitate comparing the performance data associated with the first activity and the second activity, comprising:

removing one or more redundant points from the first series of points to generate a first series of anchors for the first track;

removing one or more redundant points from the second series of points to generate a second series of anchors for the second track;

determining a first set of resampled points based at least in part on a first path generated from the first series of anchors;

determining a second set of resampled points based at least in part on a second path generated from the second series of anchors;

determining a first alignment between the first set of resampled points and the second set of resampled points using a scoring function;

determining a first mapping of the first set of resampled points back to the first series of anchors;

determining a second mapping of the second set of resampled points back to the second series of anchors; and determining a second alignment between the first series of anchors and the second series of anchors based at least in part on 1) the first alignment between the first set of resampled points and the second set of resampled points, 2) the first mapping of the first set of resampled points back to the first series of anchors, and 3) the second mapping of the second set of resampled points back to the second series of anchors, wherein the second alignment comprises a determination for a first point from the first series of anchors a corresponding location match point from the second series of anchors;

comparing the performance data associated with the first activity and the second activity, comprising:

determining a comparison based at least in part on a corresponding performance statistic associated with the first point from the first series of anchors and a corresponding performance statistic associated with the corresponding location match point from the second series of anchors based on results of the aligning of the first track and the second track; and outputting, in a visual display, the comparison of the performance data associated with the first activity and the second activity with a corresponding distance along the route.

12. The method of claim 11, further comprising presenting a plurality of comparisons based at least in part on corresponding performance statistics associated with a plurality of points from the first series of anchors and corresponding performance statistics associated with a corresponding plurality of points from the second series of anchors in the visual display corresponding to different distances along the route.

13. The method of claim 11, wherein the comparison comprises a difference between the corresponding performance statistic associated with the first point from the first series of anchors and the corresponding performance statistic associated with the corresponding location match point from the second series of anchors.

14. The method of claim 11, wherein the comparison comprises a difference between the corresponding performance statistic comprising a time associated with the first point from the first series of anchors and the corresponding performance statistic comprising a time associated with the corresponding location match point from the second series of anchors.

15. The method of claim 11, wherein the comparison comprises a difference between the corresponding performance statistic comprising a time associated with the first point from the first series of anchors and the corresponding performance statistic comprising a time associated with the corresponding location match point from the second series of anchors and further comprising determining a time gap associated with the first point based on the difference.

16. The method of claim 11, wherein the comparison comprises a difference between the corresponding performance statistic comprising a time associated with the first point from the first series of anchors and the corresponding performance statistic comprising a time associated with the corresponding location match point from the second series of anchors and further comprising determining a distance gap based on the difference.

17. The method of claim 11, wherein the corresponding performance statistic associated with the first point includes one or more of the following: time, speed, distance traveled, heart rate, power, and temperature.

18. The method of claim 11, further comprising:

generating the first path based at least in part on the first series of anchors, wherein the first path comprises a first smooth path; and generating the second path based at least in part on the second series of anchors, wherein the second path comprises a second smooth path.

19. A non-transitory computer readable storage medium with a computer program product embodied thereon, the computer program product for comparing performance data and comprising computer instructions for:

receiving a first track including a first series of points recorded by a Global Positioning System (GPS) recording device, wherein a GPS receiver of the GPS recording device is configured to record the first track including the first series of points, wherein each of the first series of points comprises a corresponding location and a corresponding performance statistic, wherein the first track is associated with a route and a first activity;

receiving a second track including a second series of points, wherein each of the second series of points comprises a corresponding location and a corresponding performance statistic, wherein the second track is associated with the route and a second activity;
aligning the first track and the second track to facilitate comparing the performance data associated with the first activity and the second activity, comprising:
  removing one or more redundant points from the first series of points to generate a first series of anchors for the first track;
  removing one or more redundant points from the second series of points to generate a second series of anchors for the second track;
  determining a first set of resampled points based at least in part on a first path generated from the first series of anchors;
  determining a second set of resampled points based at least in part on a second path generated from the second series of anchors;
  determining a first alignment between the first set of resampled points and the second set of resampled points using a scoring function;
  determining a first mapping of the first set of resampled points back to the first series of anchors;
  determining a second mapping of the second set of resampled points back to the second series of anchors; and
  determining a second alignment between the first series of anchors and the second series of anchors based at least in part on 1) the first alignment between the first set of resampled points and the second set of resampled points, 2) the first mapping of the first set of resampled points back to the first series of anchors, and 3) the second mapping of the second set of resampled points back to the second series of anchors, wherein the second alignment comprises a determination for a first point from the first series of anchors a corresponding location match point from the second series of anchors; and
comparing the performance data associated with the first activity and the second activity, comprising:
  determining a comparison based at least in part on a corresponding performance statistic associated with the first point from the first series of anchors and a corresponding performance statistic associated with the corresponding location match point from the second series of anchors based on results of the aligning of the first track and the second track; and
  outputting, in a visual display, the comparison of the performance data associated with the first activity and the second activity with a corresponding distance along the route.

* * * * *